(12) United States Patent
Guo et al.

(10) Patent No.: US 9,323,115 B2
(45) Date of Patent: Apr. 26, 2016

(54) METHOD FOR PREPARING LIQUID CRYSTAL DISPLAY PANEL, DISPLAY DEVICE AND MONOCHROMATIC QUANTUM DOT LAYER

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Renwei Guo, Beijing (CN); Xue Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 195 days.

(21) Appl. No.: 14/347,884

(22) PCT Filed: Jul. 17, 2013

(86) PCT No.: PCT/CN2013/079531
§ 371 (c)(1),
(2) Date: Mar. 27, 2014

(87) PCT Pub. No.: WO2014/183334
PCT Pub. Date: Nov. 20, 2014

(65) Prior Publication Data
US 2015/0002788 A1 Jan. 1, 2015

(30) Foreign Application Priority Data
May 17, 2013 (CN) .......................... 2013 1 0184787

(51) Int. Cl.
*G02F 1/33* (2006.01)
*G02F 1/1343* (2006.01)
(Continued)

(52) U.S. Cl.
CPC .... *G02F 1/134309* (2013.01); *G02F 1/133602* (2013.01); *G02F 1/133603* (2013.01);
(Continued)

(58) Field of Classification Search
CPC .......................................... G02F 2001/133614
See application file for complete search history.

(56) References Cited

U.S. PATENT DOCUMENTS

| 2007/0007881 A1* | 1/2007 | Kim | ....................... B82Y 10/00 |
| | | | 313/501 |
| 2011/0303940 A1* | 12/2011 | Lee | ......................... H01L 33/54 |
| | | | 257/98 |

(Continued)

FOREIGN PATENT DOCUMENTS

| CN | 101343536 A | 1/2009 |
| CN | 102492068 A | 6/2012 |

(Continued)

OTHER PUBLICATIONS

First Chinese Office Action dated Feb. 17, 2015; Appln. No. 201310184787.7.

(Continued)

*Primary Examiner* — Wen-Ying P Chen
(74) *Attorney, Agent, or Firm* — Ladas & Parry LLP (57) ABSTRACT

A process for manufacturing a liquid crystal display panel, a display device and a monochromatic quantum dot layer are disclosed; in the liquid crystal display panel, a plurality of pixel units are defined on the liquid crystal display panel, each pixel unit having sub-pixel units displaying different colors, at a position of the apposing substrate or the array substrate corresponding to a sub-pixel unit of at least one color in each pixel unit, a monochromatic quantum dot layer is disposed. Dispersing of monochromatic quantum dots with a macromolecular polymer network can prevent the quantum dots from aggregation and increase the quantum yield of the quantum dots, so as to increase the light efficacy of quantum excitation, as well as avoiding the contact between the monochromatic quantum dots with oxygen and increasing the life of quantum dots.

19 Claims, 10 Drawing Sheets (51) Int. Cl.
G02F 1/1335 (2006.01)
B82Y 20/00 (2011.01)

(52) U.S. Cl.
CPC .......... *B82Y20/00* (2013.01); *G02F 1/133617* (2013.01); *G02F 2001/133614* (2013.01); *G02F 2001/134345* (2013.01); *G02F 2001/134372* (2013.01); *Y10S 977/95* (2013.01)

(56) References Cited

U.S. PATENT DOCUMENTS

2014/0132890 A1 5/2014 Zhang
2014/0204319 A1 7/2014 Cai et al.

FOREIGN PATENT DOCUMENTS

CN 102944943 A 2/2013
CN 103091895 A 5/2013

OTHER PUBLICATIONS

Second Chinese Office Action Appln. No. 201310184787.7; Dated Jul. 6, 2015.
International Search Report mailed Feb. 27, 2014; PCT/CN2013/079531.
International Preliminary Report on Patentability dated Nov. 17, 2015; PCT/CN2013/079531.

* cited by examiner

METHOD FOR PREPARING LIQUID CRYSTAL DISPLAY PANEL, DISPLAY DEVICE AND MONOCHROMATIC QUANTUM DOT LAYER

TECHNICAL FIELD

Embodiments of the invention relate to a process for manufacturing a liquid crystal display panel, a display device and a monochromatic quantum dot layer.

BACKGROUND

Quantum dots (QDs) can also be called nanocrystals, and are nanoparticles consisting of group II-VI or group III-V elements. The particle sizes of quantum dots are generally between 1~20 nm. In quantum dots, because electrons and holes are confined in quantum, the structure of continuous energy bands is turned into the structure of discrete energy bands, and thus quantum dots can emit fluorescence after being excited.

The emission spectra of quantum dots can be controlled by altering the size of the quantum dots. By altering the size and chemical composition of quantum dots, their emission spectra can be expanded to cover the whole visible region. By taking CdTe quantum dots as an example, when the particle size grows from 2.5 nm to 4.0 nm, the emission wavelength can make a red shift from 510 nm to 660 nm.

Currently, with the light emitting property of quantum dots, quantum dots can be used as molecular probes in fluorescent labeling and can also be used in a display device. Monochromatic quantum dots are used as the light source of the backlight module of a liquid crystal display panel, in which after excited by a blue LED, the monochromatic quantum dots emit monochromatic light which mixes with the blue light to form a white background light, which has large light gamut and can improve the display quality.

Because nano-scale quantum dots possess poor dispersion capability in organic solvents, upon subsequent pattern forming, the quantum dots will aggregate, resulting in quenching, which severely reduce the quantum yield. Therefore, currently there has been no design in which quantum dots are used inside a liquid crystal display panel.

SUMMARY

Embodiments of the invention provide a process for manufacturing a liquid crystal display panel, a display device and a monochromatic quantum dot layer, for increasing the gamut of the display panel, thereby improving the display quality.

An aspect of the invention provides a liquid crystal display panel comprising an apposing substrate, an array substrate, and a liquid crystal layer positioned between the apposing substrate and the array substrate; in which a plurality of pixel units are defined on the liquid crystal display panel, each pixel unit having sub-pixel units displaying different colors, and at a position of the apposing substrate or the array substrate corresponding to a sub-pixel unit of at least one color in each pixel unit, a monochromatic quantum dot layer is disposed; the monochromatic quantum dot layer, upon being excited by background light, emits monochromatic light corresponding to the color of the sub-pixel unit; the monochromatic quantum dot layer comprises a macromolecular polymer network as well as monochromatic quantum dots dispersed within the macromolecular polymer network; the macromolecular polymer network is formed by polymerization between an organic modifier on surfaces of the monochromatic quantum dots and polymerizable monomers containing double-bond, in which the organic modifier comprises a hydroxyl functional group as well as a sulfhydryl group.

Another aspect of the invention provides a display device comprising the liquid crystal display panel provided by an embodiment of the invention.

A further aspect of the invention provides a process for manufacturing a monochromatic quantum dot layer comprising coating a mixture of monochromatic quantum dots surfaces of which are modified by an organic modifier and polymerizable monomers containing double-bond, wherein the organic modifier comprises a hydroxyl functional group as well as a sulfhydryl group; and polymerizing the organic modifier on the surfaces of the monochromatic quantum dots and polymerizable monomers containing double-bond to generate a macromolecular polymer network, wherein the monochromatic quantum dots are evenly dispersed within the macromolecular polymer network.

DESCRIPTION OF DRAWINGS

In order to more clearly illustrate the technical solution of the examples of the invention, drawing of the examples are briefly introduced below. It is apparent that the drawings described below only involve some examples of the invention, rather than limit the invention.

DETAILED DESCRIPTION

In order to make the purpose, technical solutions and advantages of the invention more clear, a clear and complete description of the technical solutions of the invention will be conducted in relation to the drawings of the invention. Apparently, the embodiments described are some embodiments rather than all embodiments of the present invention. Based on the embodiments of the invention described, any other embodiment obtainable by a person of ordinary skill in the art without resorting to inventive work falls into the scope of the invention.

The thickness of each film and the size and shape of the regions in the figures do not reflect the real scales of the array substrate or the apposing substrate, but instead intended to exemplify the invention.

Unless defined otherwise, any technical or scientific terms used herein have the usual meaning understood by a person of ordinary skill in the relevant art. The "first", "second" and the like used in the description and claims of the present patent application do not indicate any order, number or significance, but merely distinguish different components. Similarly, terms such as "a", "an" or "the" do not intend to define the number, but to indicate the presence of at least one. Terms such as "comprise", "include" or the like mean that the element or object preceding the term encompasses the element(s) or object(s) and equivalent(s) thereof enumerated following the term, without excluding other element or object. Terms such as "link" or "connect" or the like are not limited to physical or mechanical connection, but also encompass electrical connection, no matter directly or indirectly. "Above", "under", "left", "right" and the like are merely used to indicate relative spatial relations. When the absolute position of the object described changes, these relative spatial relations may change accordingly.

Figure 1A:
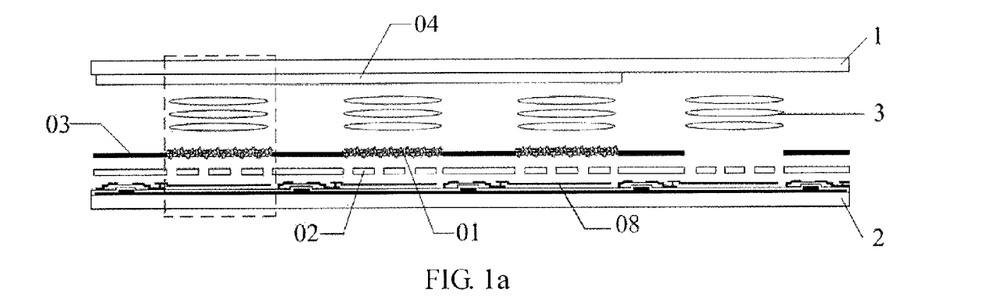
FIG. 1a, FIG. 1b and FIG. 1c are each a structural diagram of the liquid crystal display panel provided by an embodiment of the invention.
Figure 1B:
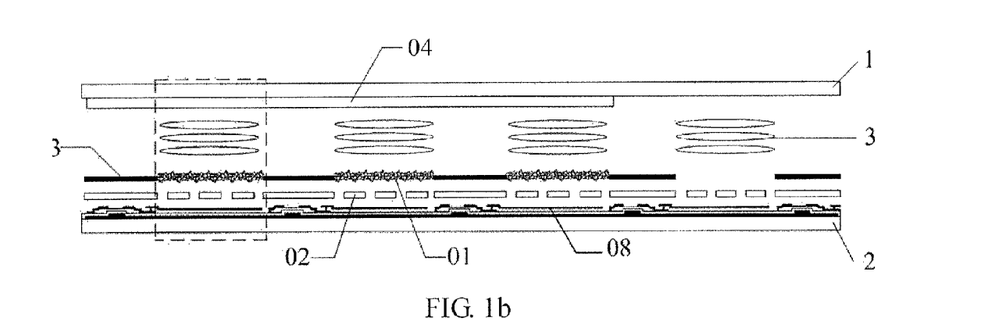

An embodiment of the invention provides a liquid crystal display panel, as illustrated in FIG. 1a and FIG. 1b, comprising an apposing substrate 1, an array substrate 2, as well as a liquid crystal layer 3 provided between the apposing substrate 1 and the array substrate; a plurality of pixel units are disposed on the array substrate 2, that is, the plurality of pixel units are disposed within the liquid crystal display panel, which pixel units may be arranged in an array. Each pixel unit has sub-pixel units displaying different colors (each sub-pixel unit is indicated in the dashed box in the figure). For example, these sub-pixel units are used to exhibit red light, green light, or blue light.

In this liquid crystal display panel, at a position of the apposing substrate 1 or the array substrate 2 corresponding to the sub-pixel unit of at least one color in each pixel unit, a monochromatic quantum dot layer 01 is disposed; and the monochromatic quantum dot layer 01, upon being excited by background light, emits monochromatic light corresponding to the color of the sub-pixel unit. The background light, for example, comes from the backlight module of the liquid crystal display panel.

The monochromatic quantum dot layer comprises a macromolecular polymer network as well as monochromatic quantum dots evenly dispersed within the macromolecular polymer network, for example, the monochromatic quantum dot layer consists of a macromolecular polymer network as well as monochromatic quantum dots evenly dispersed within the macromolecular polymer network. For example, the macromolecular polymer network is formed by the polymerization between the organic modifier on the surfaces of the monochromatic quantum dots and polymerizable monomers containing double-bond, and the organic modifier comprises a hydroxyl functional group as well as sulfhydryl bond.

Figure 2:
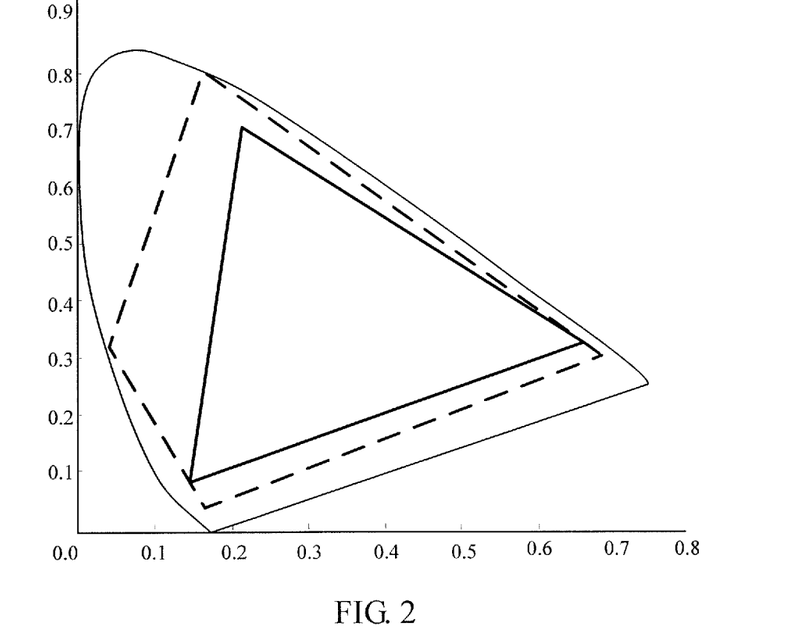
FIG. 2 is a diagram simulating the gamuts of the liquid crystal display panel provided by an embodiment of the invention and an existing liquid crystal display panel.

In the liquid crystal display panel provided by an embodiment of the invention, a monochromatic quantum dot layer is employed to replace the existing colored resin as the colored filter to convert background light into chromatic light; the orientating of the liquid crystal molecules in the liquid crystal layer is controlled by the electric filed generated between the pixel electrode and the common electrode in the sub-pixel unit to adjust the intensity of the light passing through the sub-pixel unit, so as to achieve liquid crystal color display. Because quantum dots have narrow emission spectra and high light emitting efficiency, they can convert background light into chromatic light with high efficiency. As illustrated in the FIG. 2 in which gamuts are simulated, because all the monochromatic quantum dot layers emit chromatic light of different colors, such as combinations of red light, yellow light, green light, cyan light and blue light, the gamut curve may reach the edge of the gamut (as indicated by dashed line in the figure). As compared to the gamut curve formed by the traditional three primary colors of red, green and blue (indicated by solid line in the figure), because other pure color, such as the aforesaid yellow, is added, the range of the gamut can be increased. Moreover, as long as the quantum dots (QD) are modified to a certain size, they are able to emit yellow light. Because the quantum dots emit light with a narrower half peak width, purer light can be obtained. Therefore, the area formed on the four corners of the gamut in the invention is enlarged more. That is, light emitting by quantum dots is illustrated to result in a larger gamut. By the aforesaid way, the embodiment of the invention can increase the gamut of the liquid crystal display panel, enhance the color saturation, and thus improve the display quality of the display panel.

By way of using organic modifier to modify the surfaces of monochromatic quantum dots can increase the dispersity of quantum dots in an organic solvent. Moreover, by polymerization between the organic modifier on the surfaces of the monochromatic quantum dots and polymerizable monomers containing double-bond to produce a macromolecular polymer network, the monochromatic quantum dots are allowed to be more stably dispersed within the macromolecular polymer network, preventing the quantum dots from aggregating, increasing the quantum yield of the quantum dots, so as to increase the light efficacy of quantum excitation. Moreover, the macromolecular polymer network can isolate air from monochromatic quantum dots, avoiding the contact between the monochromatic quantum dots with oxygen so as to increase the life of quantum dots.

The liquid crystal display panel provided by an embodiment of the invention is applicable to many types. For example, it can be applied to In-Plane Switch (IPS) type or Advanced Super Dimension Switch (ADS) type liquid crystal display panel, which can achieve wide visual angle. It may also be applied to the conventional Twisted Nematic (TN) type liquid crystal display panel, Vertical Alignment (VA) type liquid crystal display panel, or the like. No limitation is intended herein.

The following liquid crystal display panels provided by an embodiment of the invention are illustrated by using an ADS liquid crystal display panel as an example.

According to one embodiment, the monochromatic quantum dot layer 01 disposed within each sub-pixel unit, for example, can be disposed on the side of the array substrate 2 facing the liquid crystal layer 3. For example, the array substrate 2 as illustrated in FIG. 1a has a common electrode 02, and the monochromatic quantum dot layer 01 is disposed over the common electrode 02. This common electrode 02 can be positioned above the pixel electrode 08 of the array substrate 2 as illustrated in FIG. 1a, or under the pixel electrode 08, or the common electrode 02 is disposed at the same layer as the pixel electrode 08. The monochromatic quantum dot layer 01 can be disposed above the common electrode 02 and the pixel electrode 08 of the array substrate 2, and the monochromatic quantum dot layer 01 is insulated from the common electrode 02 and pixel electrode 08. In the figure, the pixel electrode 08 is a plate electrode, and the common electrode 02 is a silt electrode. Where the common electrode 02 and pixel electrode 08 are disposed on the same layer, both are silt electrodes.

Of course, according to the embodiments of the invention and the need of the manufacturing process, each the monochromatic quantum dot layer 01 can be disposed on the side of the array substrate 2 away from the liquid crystal layer 3 (for example, under the array substrate 2 in FIG. 1a), or each the monochromatic quantum dot layer 01 is disposed between other film layers in the array substrate 2. No particular limitation is imposed herein. The background light from under the array substrate 2 first illuminate on each the monochromatic quantum dot layer 01 in the sub-pixel unit, the quantum dots in each the monochromatic quantum dot layer 01 are excited by the background light to generate the corresponding chromatic light, and each chromatic light is regulated by the liquid crystal layer controlled by the electric field generated between the common electrode 02 and the pixel electrode 08 so that the light intensity of each chromatic light is changed to achieve liquid crystal color display.

Where each monochromatic quantum dot layer 01 is disposed on the array substrate 2, the black matrix 03 can be disposed on the same layer as each monochromatic quantum dot layer 01, as illustrated in FIG. 1a, with both disposed on the array substrate 2. Of course, the black matrix 03 can be disposed on the side of the apposing substrate 1 facing the liquid crystal layer 3 as well. No particular limitation is posed here.

According to one embodiment, the monochromatic quantum dot layer 01 disposed within each sub-pixel unit, for example, can also been disposed on the side of the apposing substrate 1 facing the liquid crystal layer 3 as illustrated in FIG. 1b, or disposed under the apposing substrate 1. The background light from under the array substrate 2 is first regulated by the liquid crystal layer controlled by the electric field generated between the common electrode and the pixel electrode, and then illuminate on each monochromatic quantum dot layer 01 in the sub-pixel unit, and the quantum dots in each monochromatic quantum dot layer 01 is excited by the background light to produce the corresponding chromatic light so as to achieve liquid crystal color display.

Figure 1C:
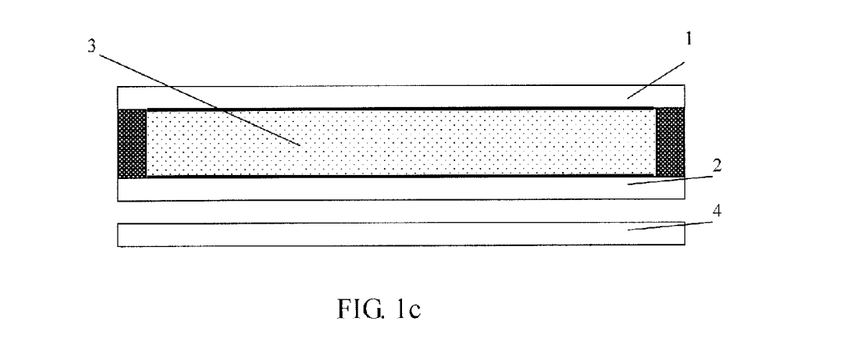

In the liquid crystal display panel provided by an embodiment of the invention, as illustrated in FIG. 1c, there is also a backlight module 4 on the side of the array substrate 2 away from the liquid crystal layer (such as under the array substrate 2 in FIGS. 1a and 1b). For example, the background light emitted from the backlight module 4 is blue light which has a central wavelength of about 450 nm, so as to enable the monochromatic quantum dots in each monochromatic quantum dot layer to produce corresponding chromatic light upon excited. Of course, based on the excitation wavelength of the quantum dots actually employed, near ultraviolet light can also be chosen as the background light. No limitation is imposed herein. The backlight module may, for example, be a side illumination backlight module or a direct backlight module. The light source employed is, for example, a light emitting diode or the like.

Where blue light is chosen as the background light to excite each monochromatic quantum dot layer, in order to prevent blue background light from passing through the sub-pixel unit after absorption by each monochromatic quantum dot layer, resulting in the poor purity of the chromatic light emitted from the sub-pixel unit, an absorption layer 04 for absorbing the blue light can be disposed over the monochromatic quantum dot layer 01 corresponding to each sub-pixel unit disposed with a monochromatic quantum dot layer 01, and correspondingly, the absorption layer 04 is not disposed at the position of sub-pixel units emitting blue light. For example, as illustrated in FIG. 1a and FIG. 1b, the absorption layer 04 is disposed on the side of the apposing substrate 1 facing the liquid crystal layer 3. Moreover, the disposed absorption layer 04 can also shield the external blue light entering the liquid crystal display panel from the side of the apposing substrate 1 away from the liquid crystal layer 3, so as to avoid the external blue light from exciting the quantum dots in the monochromatic quantum dot layer, such excitation making it hard to control the intensity of the monochromatic light emitting from the sub-pixel unit and disadvantageously affecting the liquid crystal display quality.

According to one embodiment of the invention, as the material for the absorption layer 04, 5-(1-methyl-2-pyrrolyl-methyl)rhodanine or derivatives thereof can be employed.

For example, as illustrated in FIG. 1a and FIG. 1b, where blue light is chosen as the background light to excite each monochromatic quantum dot layer 01, the blue light can also been directly used as the primary color light of one pixel unit. That is, if each pixel unit has sub-pixel units displaying N different colors, then sub-pixel units of N−1 colors are provided with monochromatic quantum dot layers, whereas one sub-pixel unit is not provided with the monochromatic quantum dot layer (thereby appearing as a passing-through hole). The blue light serving as the background light passes through the sub-pixel unit directly, and blue light, the intensity of which has been modulated by the liquid crystal layer, is emitted. Here, N is an integer greater than or equal to 2. Where N is 2, the display colors of the two sub-pixel units constituting one pixel unit are complementary to each other, for example, orange and blue, respectively.

Figure 3A:
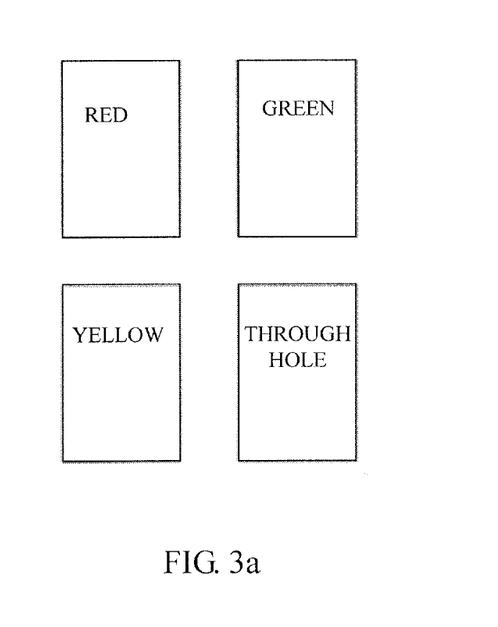
FIG. 3a-FIG. 3d are diagrams showing the arrangement of the sub-pixel units in the pixel unit provided by an embodiment of the invention.
Figure 3B:
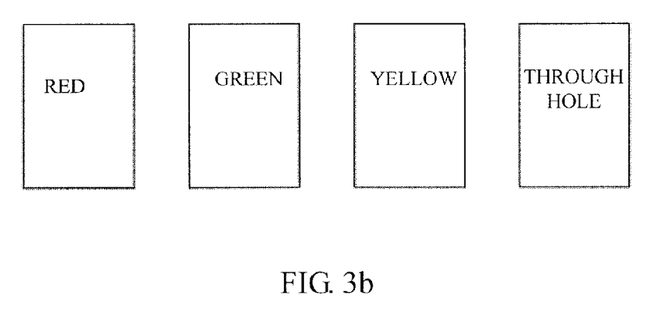
Figure 3C:
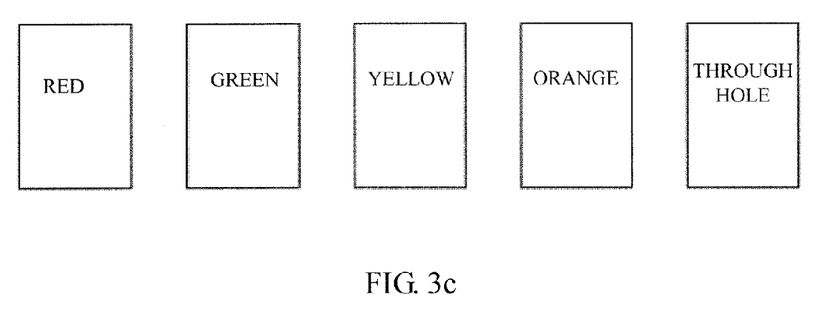
Figure 3D:
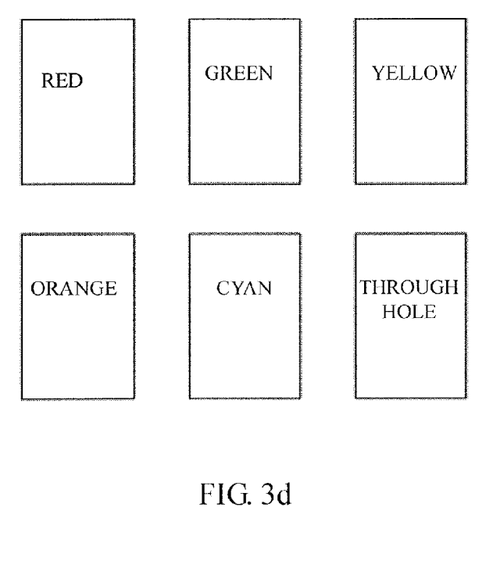

According to an embodiment of the invention, one pixel unit can be composed of 4, 5, or 6 colors. No limitation is imposed herein. For example, where one pixel unit is composed of four colors of blue, red, green and yellow, each pixel unit has four sub-pixel units which can be arranged and combined as illustrated in FIG. 3a or in FIG. 3b. No limitation is imposed herein. In the configuration of FIGS. 3a and 3b, one sub-pixel unit is not disposed with a monochromatic quantum dot layer, through which the background blue light passes directly, that is, a passing-through hole structure. The other 3 sub-pixel units are respectively disposed with a monochromatic quantum dot layer emitting red light, a monochromatic quantum dot layer emitting green light, and a monochromatic quantum dot layer emitting yellow light. Further for example, where one pixel unit is composed of five colors of blue, red, green, yellow, and orange, each pixel unit has 5 sub-pixel units which can be arranged and combined as illustrated in FIG. 3c, in which one sub-pixel unit is not disposed with a monochromatic quantum dot layer, through which the background blue light passes directly, that is, a passing-through hole structure. The other 4 sub-pixel units are respectively disposed with a monochromatic quantum dot layer emitting red light, a monochromatic quantum dot layer emitting green light, a monochromatic quantum dot layer emitting yellow light, and a monochromatic quantum dot layer emitting orange light. Further for example, where one pixel unit is composed of 6 colors of blue, red, green, yellow, orange, and cyan, each pixel unit has 6 sub-pixel units which can be arranged and combined as illustrated in FIG. 3d, in which one sub-pixel unit is not disposed with a monochromatic quantum dot layer, through which the background blue light passes directly, that is, a passing-through hole structure. The other 5 sub-pixel units are respectively disposed with a monochromatic quantum dot layer emitting red light, a monochromatic quantum dot layer emitting green light, a monochromatic quantum dot layer emitting yellow light, a monochromatic quantum dot layer emitting orange light, and a monochromatic quantum dot layer emitting cyan light. The arrangement of sub-pixel units in each pixel unit is not limited to those as illustrated in FIGS. 3a-3d. For example, the sub-pixel units on the upper and lower rows can be arranged in a staggered manner.

A monochromatic quantum dot layer that emits red light, green light, yellow light, orange light or cyan light excited by background light can be selected. The light emitting wave band can be controlled by controlling the particle size of the quantum dots. By taking ZnS quantum dots as an example, the quantum dots that emits red light have size primarily at about 9~10 nm, the quantum dots that emits yellow light have size primarily at about 8 nm, and the quantum dots that emits green light have size primarily at about 7 nm.

It should be noted that the monochromatic quantum dot layer of the invention means that the quantum dots disposed at the positions of the array substrate or apposing substrate corresponding to the sub-pixel units of the same color are the same, and the quantum dots disposed at the positions of the array substrate or apposing substrate corresponding to the sub-pixel units of different colors are different. Here, the difference can be difference in the size or material of the quantum dots, as long as it is ensured that the quantum dots at sub-pixel units corresponding to various colors only emit chromatic light corresponding to the colors of the sub-pixel units upon excitation. That is to say, quantum dots at various regions of the monochromatic quantum dot layer can only emit chromatic light upon excitation, but the sub-pixel unit regions corresponding to different colors emit different chromatic light.

Figure 4A:
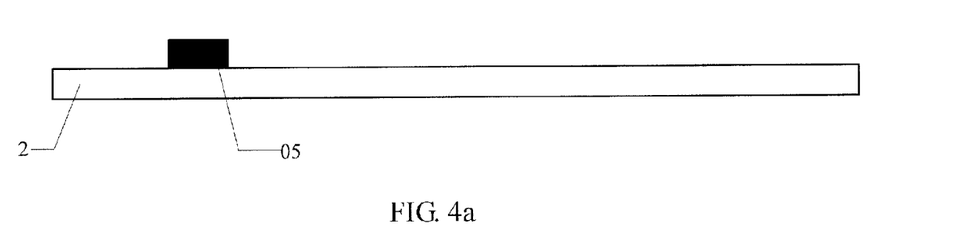
FIG. 4a-FIG. 4k are diagrams showing the steps of the preparation of the array substrate provided by an embodiment of the invention.
Figure 4B:
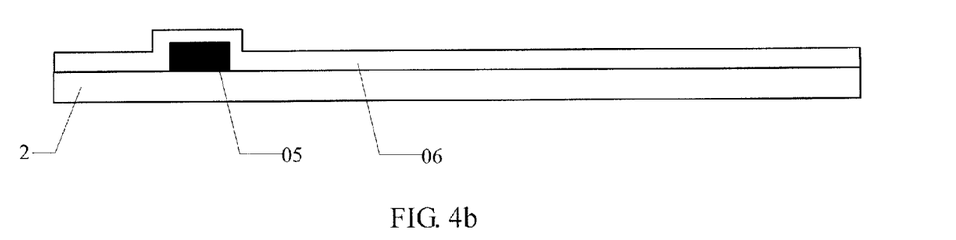
Figure 4C:
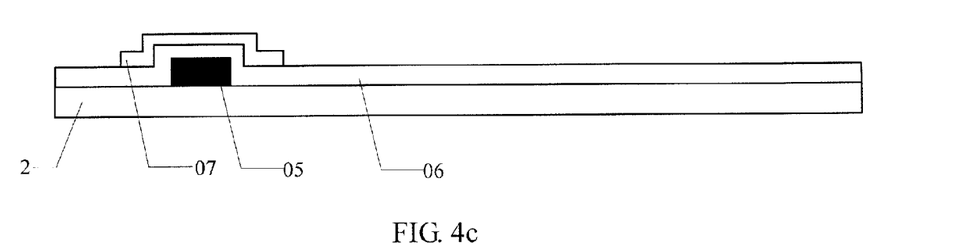
Figure 4D:
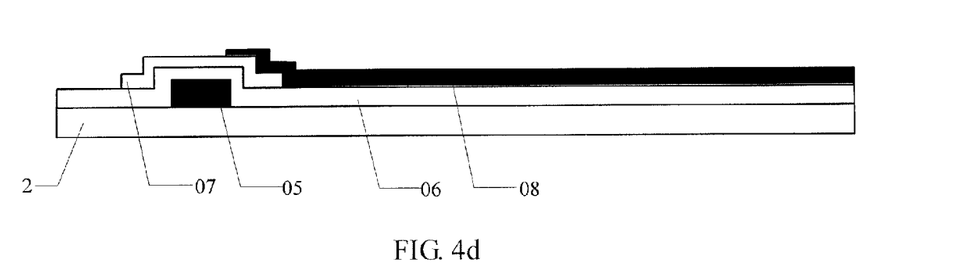
Figure 4E:
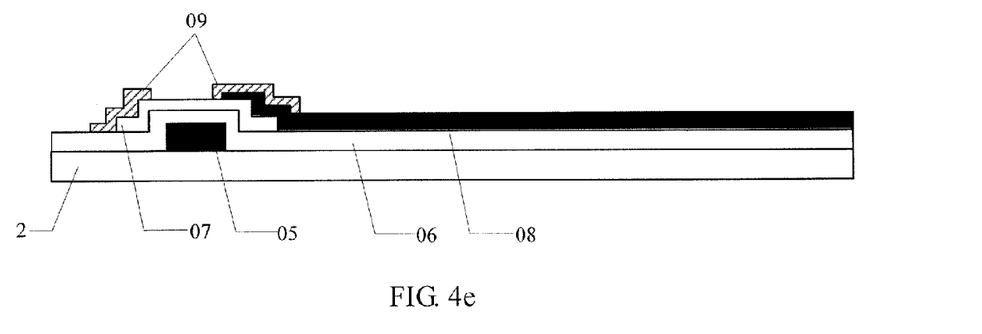
Figure 4F:
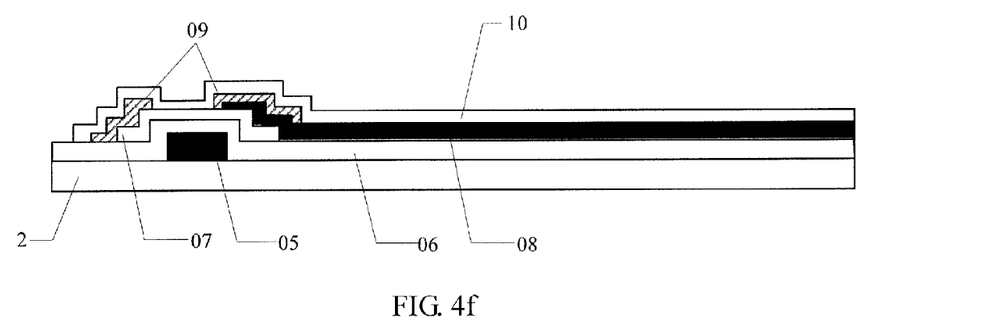
Figure 4G:
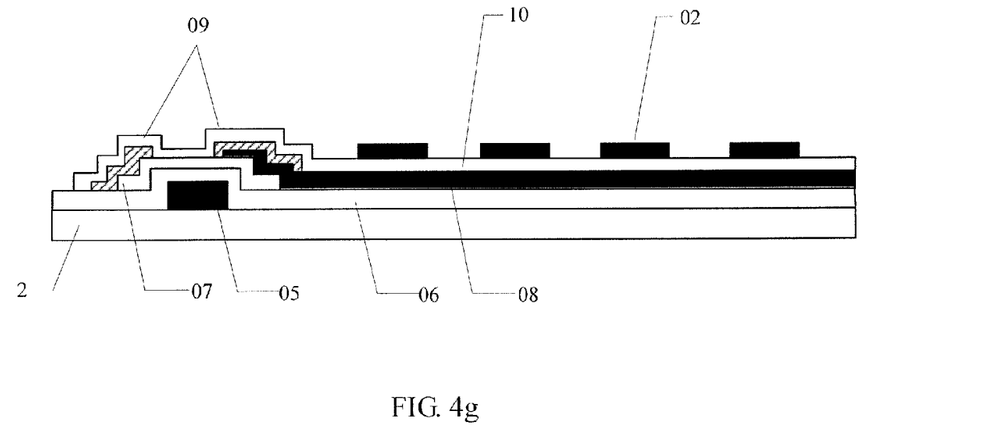
Figure 4H:
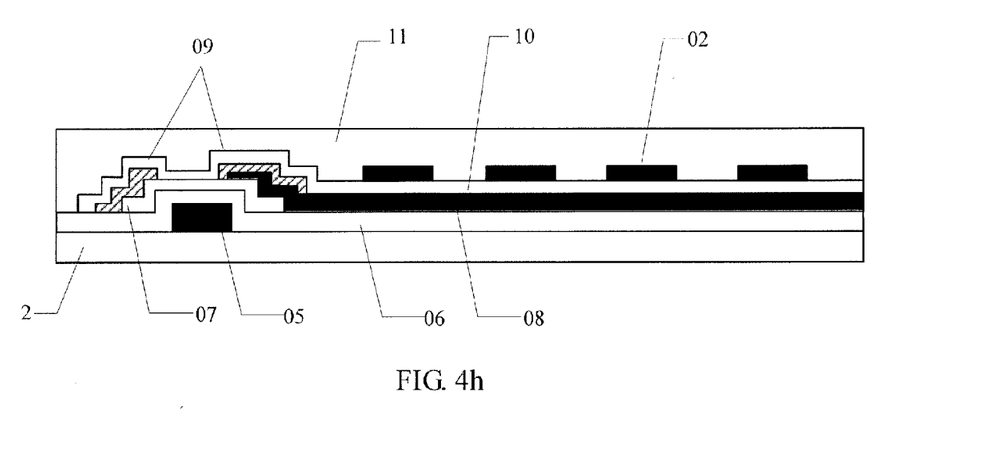
Figure 4I:
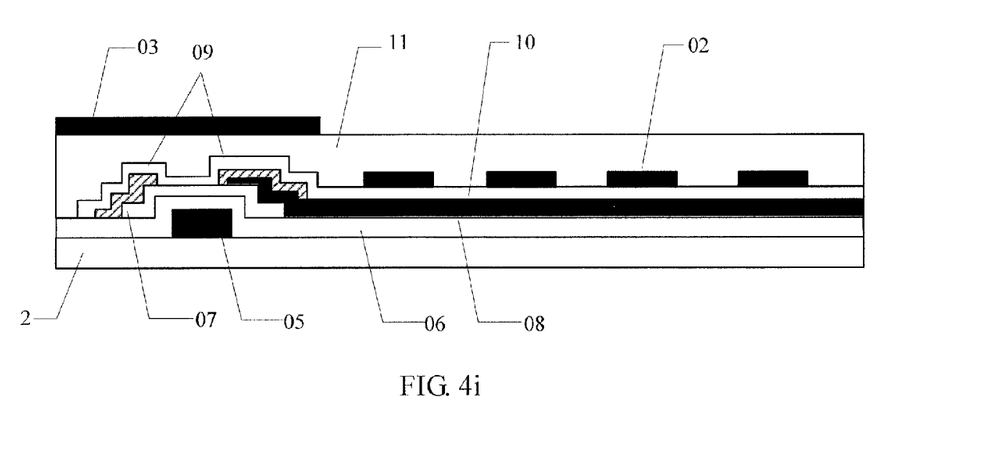
Figure 4J:
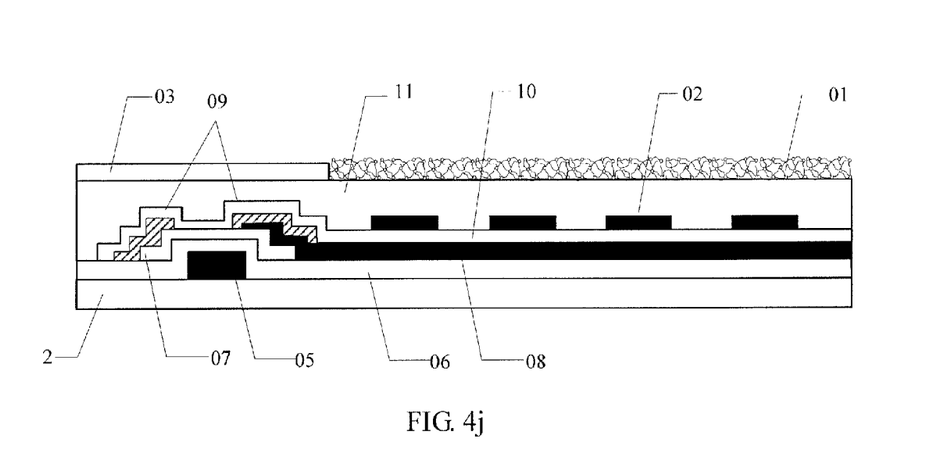
Figure 4K:
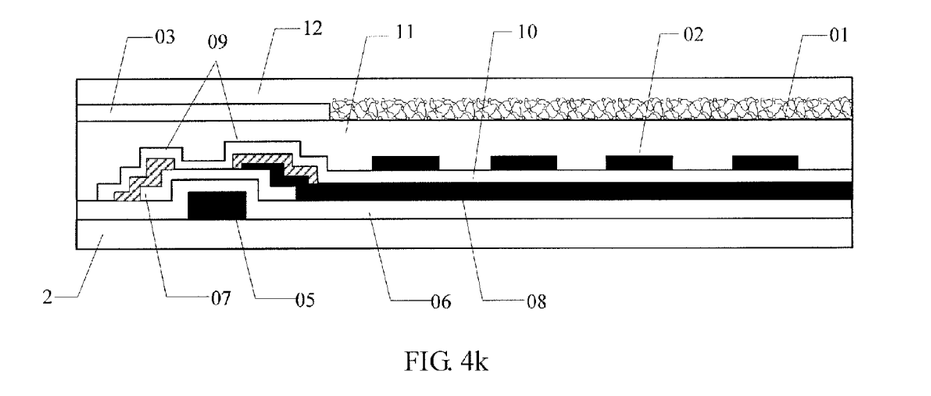

According to one embodiment, by taking the liquid crystal display panel in which each monochromatic quantum dot layer is disposed on the array substrate as an example, the process for manufacturing the array substrate may comprise the following steps as illustrated in FIG. 4a-FIG. 4k:

(1) forming a gate electrode 6 on the array substrate 2 as illustrated in FIG. 4a;

(2) forming a gate insulation layer 06 on the gate electrode 05 as illustrated in FIG. 4b;

(3) forming an active layer 07 on the gate insulation layer 06 as illustrated in FIG. 4c;

(4) forming a layer of pixel electrode 08 on the active layer 07 and the gate insulation layer 06, wherein the pixel electrode 08 is a plate electrode, as illustrated in FIG. 4d;

(5) forming a source-drain electrode 09 (comprising a source electrode and a drain electrode opposite to each other) above the pixel electrode 08 and the active layer 07 respectively, as illustrated in FIG. 4e;

(6) depositing a first insulation (PVX) layer 10 on the source-drain electrode 09 and the pixel electrode 08, as illustrated in FIG. 4f;

(7) forming a strip-shaped common electrode 02, which is a silt electrode with silts being formed between the electrode strips, one the first insulation (PVX) layer 10, as illustrated in FIG. 4g;

(8) forming a second insulation (PVX) layer 11 on the common electrode 02, as illustrated in FIG. 4h;

(9) forming a black matrix 03 on the second insulation (PVX) layer 11, which black matrix 03, for example, covers the formed thin film transistor, gate line and data line, as illustrated in FIG. 4i;

(10) preparing a monochromatic quantum dot layer 01, which corresponds to and is above the pixel electrode 08 and the common electrode 02, on second insulation (PVX) layer 11, as illustrated in FIG. 4j; and (11) forming a first protection layer 12 on the black matrix 03 and the monochromatic quantum dot layer 01, as illustrated in FIG. 4k.

In the aforesaid embodiment, the thin film transistor comprising the gate electrode 05, the gate insulation layer 06, the active layer 07 as well as source-drain electrode 09 is a bottom gate type thin film transistor. However, the invention is not limited to this. For example, in another embodiment, a top gate type thin film transistor can be formed. In the aforesaid embodiment, the common electrode 02 is located above the pixel electrode 08. As described above, in other embodiments, the common electrode 02 and pixel electrode 08 may be disposed in other manners and the invention is not thus limited. Where a certain sub-pixel unit does not need the formation of the monochromatic quantum dot layer 01, it is not formed at the corresponding position, resulting in a passing-through hole structure.

Figure 5A:
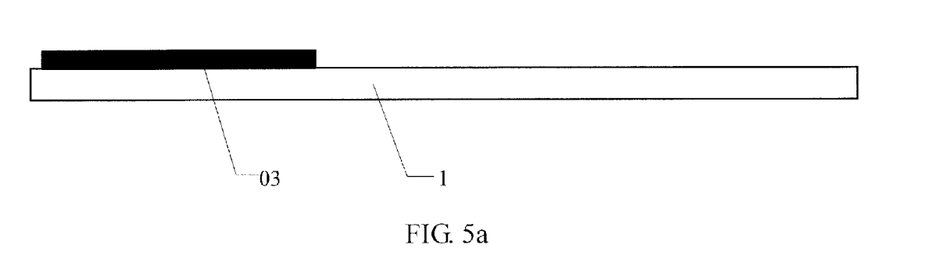
FIG. 5a-FIG. 5e are diagrams showing the steps of the preparation of the apposing substrate provided by an embodiment of the invention.
Figure 5B:
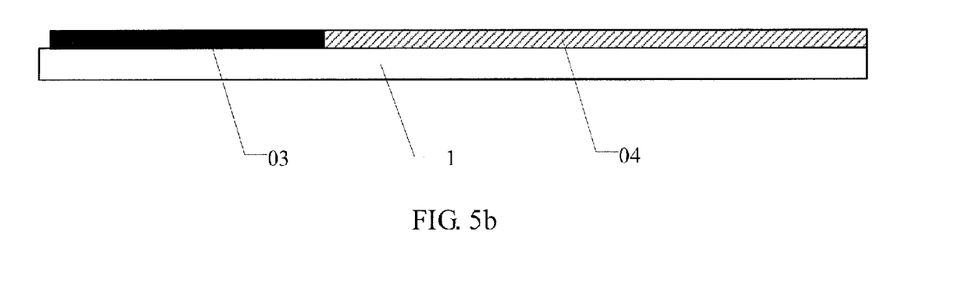
Figure 5C:
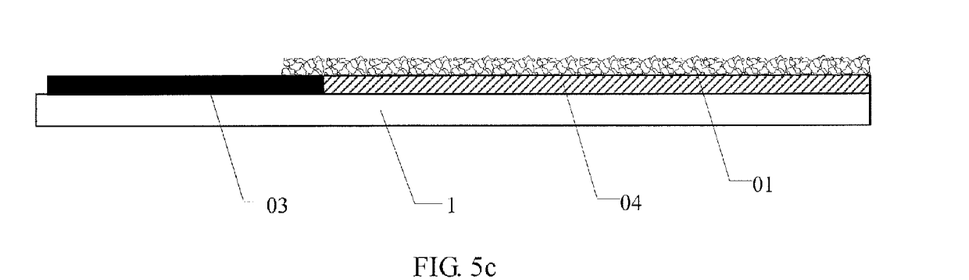
Figure 5D:
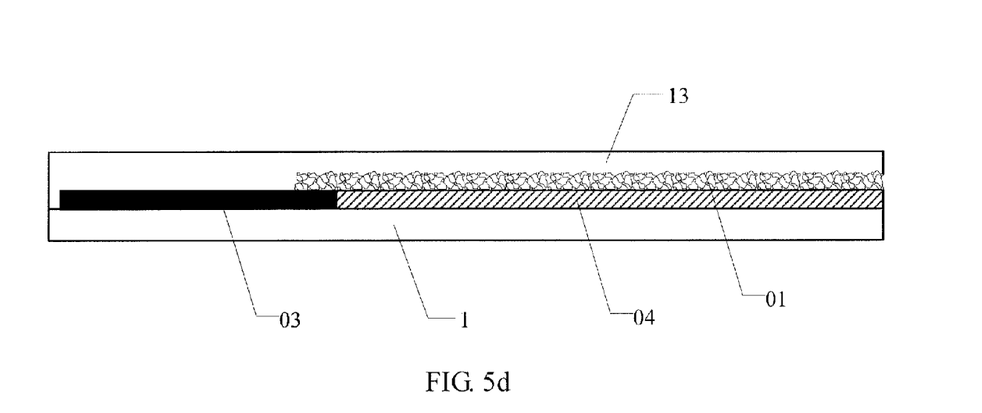

Accordingly, by taking the liquid crystal display panel in which each monochromatic quantum dot layer is disposed on the apposing substrate as an example, the process for manufacturing the apposing substrate may comprise the following steps as illustrated in FIG. 5a-FIG. 5e:

(1) forming a region of black matrix (BM) 03 above the apposing substrate 1, wherein the pixel regions are exposed through the black matrix 03, as illustrated in FIG. 5a;

(2) forming an absorption layer 04 above the black matrix (BM) 03, which absorption layer 04 covers the pixel regions exposed by the black matrix 03, as illustrated in FIG. 5b;

(3) preparing a monochromatic quantum dot layer 01 on the absorption layer 04, as illustrated in FIG. 5c; and (4) forming a second protection layer 13 on the monochromatic quantum dot layer 01, as illustrated in FIG. 5d.

Figure 5E:
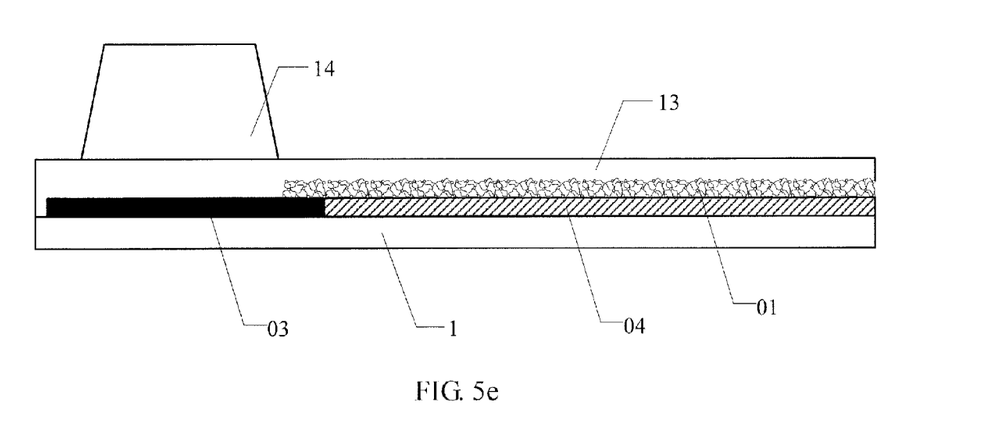

As desired, post spacers (PS) layer 14 may further be formed on the second protection layer 13, as illustrated in FIG. 5e. Where the absorption layer 04 is formed, it may cover the black matrix 03. For example, if each pixel unit comprises a sub-pixel unit emitting blue light, and the absorption layer 04 is used for absorbing the blue light, then the absorption layer 04 is not disposed at the position corresponding to the sub-pixel unit that emits blue light. The pixel regions exposed through the black matrix 03 corresponds to the sub-pixel units on the array substrate used in combination with the apposing substrate. Where the monochromatic quantum dot layer 01 is not required to be formed for a certain pixel submit, the monochromatic quantum dot layer 01 is not formed at the corresponding position, resulting in a passing-through hole structure. The array substrate used in combination with the apposing substrate in the embodiment can be of any available type.

Figure 6:
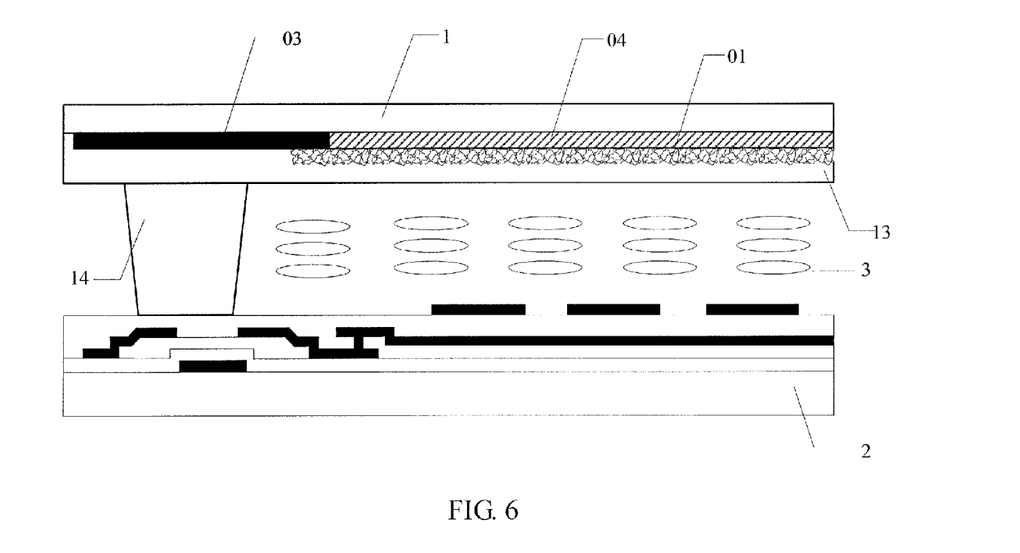
FIG. 6 is a second structural diagram of the liquid crystal display panel provided by an embodiment of the invention.

FIG. 6 is a structural diagram of a liquid crystal display panel with each monochromatic quantum dot layer being disposed on the apposing substrate.

Where a monochromatic quantum dot layer is manufactured in the aforesaid manufacturing process, in order to avoid the quenching that can be caused by the aggregation of monochromatic quantum dots, which leads to issues of decreased quantum yield, the embodiment of the invention provides a liquid crystal display panel, in which for each monochromatic quantum dot layer, surface modification of the monochromatic quantum dots with an organic modifier is employed to increase the dispersion capability of the monochromatic quantum dots in organic solvents; moreover, with polymerization between the organic modifier and polymerizable monomers containing double-bond, the monochromatic quantum dots are allowed to be more stably dispersed within the macromolecular polymer network which prevents the aggregation of quantum dots, which increases the quantum yield of the quantum dots so as to improve the optical efficiency of quantum excitation. Moreover, the macromolecular polymer network is able to shield air from the monochromatic quantum dots, which prevents the monochromatic quantum dots from contacting with oxygen, thereby increasing the life of the quantum dots.

Figure 7:
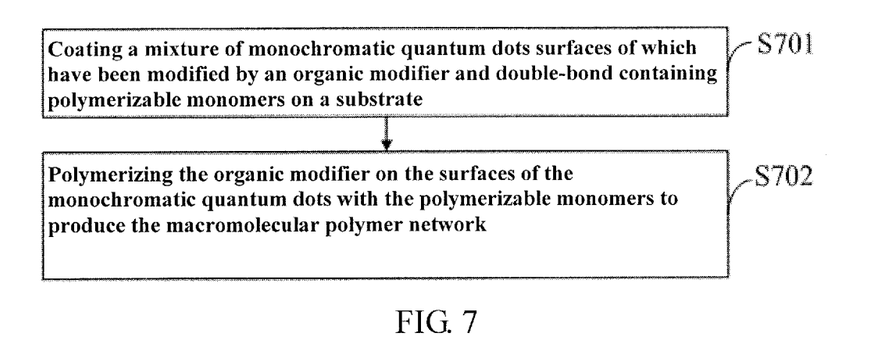
FIG. 7 a diagram showing the flow chart of a process for manufacturing the monochromatic quantum dot layer provided by an embodiment of the invention.

An embodiment of the invention further provides a process for manufacturing a monochromatic quantum dot layer comprising the following steps as illustrated in FIG. 7.

Figure 8A:
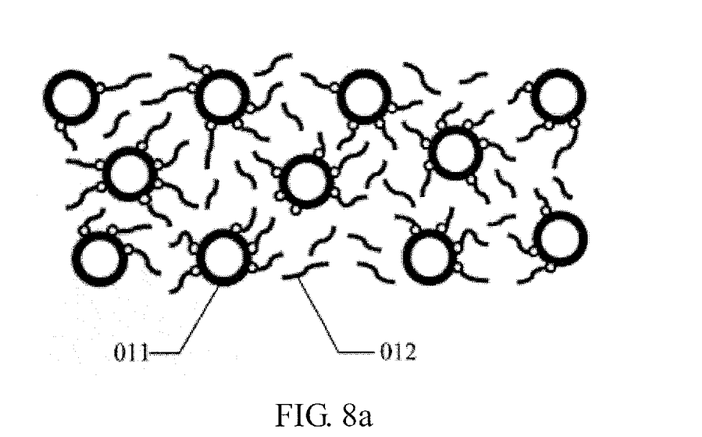
FIG. 8a and FIG. 8b are a diagram showing the steps of a process for manufacturing the monochromatic quantum dot layer provided by an embodiment of the invention.

S701, coating a mixture of monochromatic quantum dots 011 surfaces of which have been modified by an organic modifier and polymerizable monomers containing double-bond 012 on a substrate (as illustrated in FIG. 8a).

The substrate can be a glass substrate, a quartz substrate, a plastic substrate, or the like. This organic modifier comprises a hydroxyl functional group as well as a sulfhydryl bond. The sulfhydryl bond at one end of the organic modifier will attach to the monochromatic quantum dots, and the hydroxyl functional group connected by a flexible chain at the other end can cross-link with the double-bond to generate a macromolecular polymer network. With such configuration, the core-shell structure of the monochromatic quantum dots molecule can be stabilized.

Figure 8B:
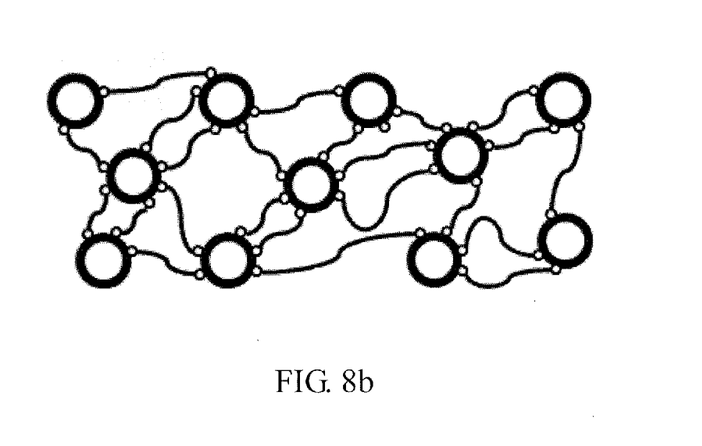

S702, for example, by way of ultraviolet radiation or heating, polymerizing the organic modifier on the surfaces of the monochromatic quantum dots with the polymerizable monomers to produce the macromolecular polymer network (as illustrated in FIG. 8b), with the monochromatic quantum dots being evenly dispersed within the macromolecular polymer network.

In an example, the step S701 can be achieved in the following manner.

(1) The monochromatic quantum dots, the organic modifier and the organic solvent are mixed together, and then adding the polymerizable monomers to obtain the mixed solution.

For example, the monochromatic quantum dots account for 1%-3% by weight. The molar ratio of the monochromatic quantum dots to the organic modifier can be 1:10. For example, the material for the monochromatic quantum dots can be one or more selected from of CdS, CdSe, CdTe, ZnO, ZnSe, and ZnTen of the group II-VI and GaAs, GaP, GaAs, GaSb, HgS, HgSe, HgTe, InAs, InP, InSb, AlAs, AlP, and AlSb of the group III-V.

For example, the material for the organic modifier can be selected from linear-chained mercapto alkyl alcohol derivative, for example, a material with the molecular structure of HS—$C_nH_{2n}$—OH.

For example, the organic solvent can be a common organic solvent such as propylene glycol monomethyl ether acetate and the like. No limitation is imposed herein.

For example, the double-bond containing polymerizable monomer can be selected from acrylic acid derivatives which may contain two to four double-bond functional groups, for example, a material with the following molecular structure:

wherein n=1, 2, 3, 4, 5, 6, 7 or 8.

(2) Spin coating the mixed solution on the substrate.

(3) For example, removing the organic solvent from the mixed solution by vacuum pumping, and providing a mixture of the monochromatic quantum dots the surfaces of which are modified by an organic modifier and the polymerizable monomers and coated on the substrate.

If ultraviolet radiation is employed in the step S702 to polymerize the organic modifier on the surfaces of the monochromatic quantum dots with the polymerizable monomers to generate the macromolecular polymer network, a photoinitiator can be further added into the mixture of the monochromatic quantum dots the surfaces of which are modified by an organic modifier and the polymerizable monomer to accelerate the reaction rate of the polymerization. For example, the photoinitiator may be one of benzoyl peroxide, lauroyl peroxide, azodiisobutyronitrile, azodiisoheptonitrile, diisopropyl peroxydicarbonate, and dicyclohexyl peroxydicarbonate or any combination thereof.

For example, the process of the polymerization of the linear-chained mercapto alkyl alcohol and the acrylic acid derivative is as follows: a double-bond in the acrylic acid derivative is added with a hydroxyl functional group of the organic modifier, and another double-bond is polymerized with other double-bond containing substances represented by R3 and R4, finally forming the macromolecular polymer network.

An embodiment of the invention further provides a display device comprising the aforesaid liquid crystal display panel provided by an embodiment of the invention. Because the device solves the issues in a mechanism similar to the aforesaid liquid crystal display panel, the implementation of the device can be conducted with reference to the implementation of the panel, and will not be redundantly repeated here.

Embodiments of the invention provide a process for manufacturing a liquid crystal display panel, a display device and a monochromatic quantum dot layer. In the liquid crystal display panel, a plurality of pixel units are defined on the liquid crystal display panel, each pixel unit having sub-pixel units displaying different colors, at a position of the apposing substrate or the array substrate corresponding to the sub-pixel unit of at least one color in each pixel unit, a monochromatic quantum dot layer is disposed; and the monochromatic quantum dot layer, upon being excited by background light, emits monochromatic light corresponding to the color of the sub-pixel unit. In the embodiment of the invention, a quantum dot layer is employed to replace the existing colored resin as the colored filter to convert the background light into monochromatic light, and because the quantum dots have narrow emission spectra and high light emitting efficiency, they can convert the background light into monochromatic light with high efficiency, increase the gamut of the liquid crystal display panel, enhance the color saturation, and thus improve the display quality of the display panel. Usage of organic modifier to modify the surfaces of monochromatic quantum dots can increase the dispersion capability of the quantum dots in an organic solvent; moreover, by polymerization of the organic modifier on the surfaces of the monochromatic quantum dots and polymerizable monomers containing double-bond to produce a macromolecular polymer network, the monochromatic quantum dots can be more stably dispersed within the macromolecular polymer network, preventing the quantum dots from aggregation, increasing the quantum yield of the quantum dots, so as to increase the light efficacy of quantum excitation. Moreover, the macromolecular polymer network can shield air from monochromatic quantum dots, avoiding the contact between the monochromatic quantum dots with oxygen so as to increase the life of quantum dots.

The aforesaid is merely the exemplary embodiment of the invention, rather than limiting the scope of the invention, which is determined by the appended claims.

The invention claimed is:

1. A liquid crystal display panel comprising an apposing substrate, an array substrate, and a liquid crystal layer positioned between the apposing substrate and the array substrate, a plurality of pixel units being defined on the liquid crystal display panel, each pixel unit having sub-pixel units displaying different colors, wherein
at a position of the apposing substrate or the array substrate corresponding to a sub-pixel unit of at least one color in each pixel unit, a monochromatic quantum dot layer is disposed; the monochromatic quantum dot layer, upon being excited by background light, emits monochromatic light corresponding to the color of the sub-pixel unit;
the monochromatic quantum dot layer comprises a macromolecular polymer network as well as monochromatic quantum dots evenly dispersed within the macromolecular polymer network; the macromolecular polymer network is formed by polymerization between an organic modifier on surfaces of the monochromatic quantum dots and polymerizable monomers containing double-bond, in which the organic modifier comprises a hydroxyl functional group as well as a sulfhydryl group.

2. The liquid crystal display panel according to claim 1, wherein the monochromatic quantum dot layer provided at a side of the array substrate facing the liquid crystal layer, or provided at a side of the apposing substrate facing the liquid crystal layer.

3. The liquid crystal display panel according to claim 1, wherein the side of the array substrate facing the liquid crystal layer is further provided with a common electrode and a pixel electrode, the monochromatic quantum dot layer is above the pixel electrode and the common electrode of the array substrate, and the monochromatic quantum dot layer is insulated from the common electrode and the pixel electrode.

4. The liquid crystal display panel according to claim 1, further comprising a backlight module located at a side of the array substrate opposite to the liquid crystal layer, which emits background light which is blue light.

5. The liquid crystal display panel according to claim 4, wherein each pixel unit has sub-pixel units displaying N different colors, sub-pixel units of N−1 colors are each provided with the monochromatic quantum dot layer, and N is an integer greater than or equal to 2.

6. The liquid crystal display panel according to claim 4, wherein an absorption layer for absorbing blue light is disposed on the monochromatic quantum dot layer corresponding to each sub-pixel unit disposed with the monochromatic quantum dot layer.

7. The liquid crystal display panel according to claim 6, wherein 5-(1-methyl-2-pyrrolylmethyl)rhodanine or a derivative thereof is employed as a material for the absorption layer.

8. The liquid crystal display panel according to claim 1, wherein the monochromatic quantum dot layer emits red light, green light, yellow light, orange light or cyan light upon being excited by the background light.

9. The liquid crystal display panel according to claim 1, wherein the material for the monochromatic quantum dots is CdS, CdSe, CdTe, ZnO, ZnSe, ZnTe, GaAs, GaP, GaAs, GaSb, HgS, HgSe, HgTe, InAs, InP, InSb, AlAs, AlP or AlSb.

10. The liquid crystal display panel according to claim 1, wherein the material for the organic modifier is a linear-chained mercapto alkyl alcohol derivative.

11. The liquid crystal display panel according to claim 1, wherein the material for the polymerizable monomer is crylic acid derivative.

12. A display device, comprising the liquid crystal display panel according to claim 1.

13. A process for manufacturing a monochromatic quantum dot layer comprising:
coating a mixture of monochromatic quantum dots surfaces of which are modified by an organic modifier and polymerizable monomers containing double-bond on the substrate, wherein the organic modifier comprises a hydroxyl functional group as well as a sulfhydryl group; and
polymerizing the organic modifier on the surfaces of the monochromatic quantum dots and polymerizable monomers containing double-bond to generate a macromolecular polymer network, wherein the monochromatic quantum dots are evenly dispersed within the macromolecular polymer network.

14. The process according to claim 13, wherein coating of the mixture of monochromatic quantum dots surfaces of which are modified by an organic modifier and polymerizable monomers containing double-bond on the substrate comprises:

mixing the monochromatic quantum dots, the organic modifier and an organic solvent, and then adding the polymerizable monomers to obtain the mixed solution;

spin coating the mixed solution on the substrate; and removing the organic solvent from the mixed solution and thus obtaining the mixture of the monochromatic quantum dots the surfaces of which are modified by the organic modifier and the polymerizabie monomers and coated on the substrate.

15. The process according to claim 14, wherein the monochromatic quantum dots account for 1%-3% by weight of the mixture and the molar ratio of the monochromatic quantum dots to the organic modifier is 1:10.

16. The process according to claim 13, wherein a material for the monochromatic quantum dots is CdS, CdSe, CdTe, ZnO, ZnSe, ZnTe, GaAs, GaP, GaAs, GaSb, HgS, HgSe, HgTe, InAs, InP, InSb, AlAs, AlP or AlSb.

17. The process according to claim 13, wherein a material for the organic modifier is a linear-chained mercapto alkyl alcohol derivative.

18. The process according to claim 13, wherein a material for the polymerizable monomer is an acrylic acid derivative.

19. The process according to claim 13, wherein the organic modifier on the surfaces of the monochromatic quantum dots is polymerized with the polymerizable monomer by way of ultraviolet radiation or heating.

* * * * *